United States Patent [19]
Gorman et al.

[11] 3,912,029
[45] Oct. 14, 1975

[54] WEIGHING APPARATUS

[75] Inventors: Leonard Francis Gorman, Farnborough; Leslie John Parry, Bracknell, both of England

[73] Assignee: Weighwrite Limited, England

[22] Filed: Aug. 21, 1974

[21] Appl. No.: 499,117

[30] Foreign Application Priority Data
Aug. 23, 1973 United Kingdom............... 40056/73

[52] U.S. Cl....................... 177/210; 177/1; 328/165
[51] Int. Cl.[2]........................ G01G 3/14; H03B 1/04
[58] Field of Search................ 177/1, 210, 163, 185; 328/165

[56] References Cited
UNITED STATES PATENTS
3,670,333   6/1972   Tomohiko et al. .................... 177/1

Primary Examiner—George H. Miller, Jr.
Attorney, Agent, or Firm—Young & Thompson

[57] ABSTRACT

Apparatus for weighing vehicles in motion comprising a support member across which vehicles to be weighed will travel, and a transducer arranged to produce a first electrical signal indicative of the force applied to the support member when a vehicle passes over it. Also provided is a filter circuit for attenuating the alternating component in the first electrical signal. This filter circuit comprises means for deriving from the first signal a second signal corresponding to the alternating component thereof, and means for combining the first and second signal in such a way as at least partially to remove the alternating component of the first signal.

3 Claims, 1 Drawing Figure

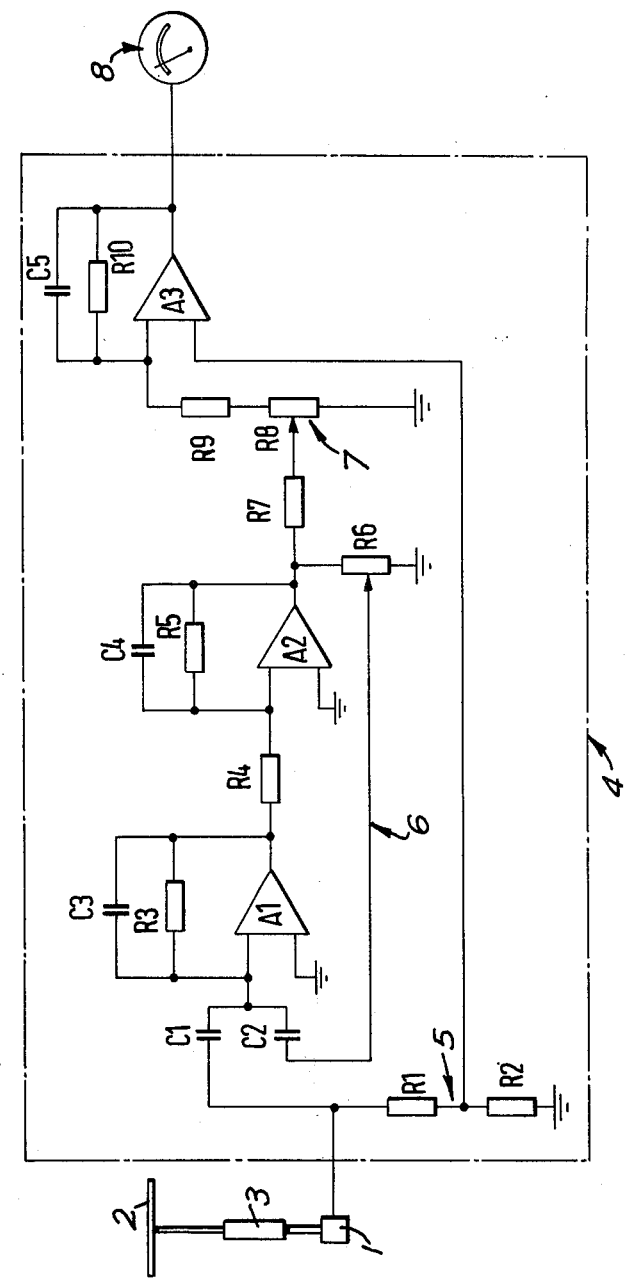

WEIGHING APPARATUS

This invention relates to vehicle weighing apparatus.

More particularly it is concerned with the type of apparatus, commonly known as a weighbridge, for indicating the total, or axle weight of a vehicle disposed on a platform and in which an electrical signal indicative of the weight of the vehicle is produced, using a transducer coupled to the platform.

It would be advantageous to be able to weigh a vehicle whilst it is in motion, without having to bring it to a halt on the weighing platform. However, weighing in motion presents a particularly serious problem.

When a vehicle is in motion it produces vibration relative to its supporting surface. This vibration tends to produce spurious or indeterminate indications of weight when weighing in motion. The invention is accordingly concerned with a weighing apparatus with which the undesirable effects of vibration on the determination of weight are alleviated.

According to the invention there is provided apparatus for weighing vehicles in motion comprising a support member across which vehicles to be weighed will travel, a transducer arranged to produce a first electrical signal indicative of the force applied to the support member when a vehicle passes over it and a filter circuit for attenuating an alternating component in said first electrical signal, said filter circuit comprising means for deriving from the first signal a second signal corresponding to the alternating component thereof and means for combining the first signal and the second signal so as at least partially to remove the alternating component of the first signal.

The circuit may comprise a first circuit path extending from an input to which the first electrical signal is applied to a first input terminal of an operational amplifier, and a second circuit path for producing the second electrical signal, extending between the said input, and a second input terminal of the operational amplifier. The second circuit path may include a capacitor, which passes only the alternating component of the first signal, and a pair of serially connected operational amplifiers having reactive feedback circuits such as to ensure the correct phase relationship between the second signal and the corresponding component of the first signal appearing at the inputs to the operational amplifier. The feedback circuits of these two operational amplifiers each includes parallel capacitance and resistance, the values of which are adjusted to produce this correct phase relationship.

Means responsive to the signal produced by removal of the alternating component may be provided for presentation of a visual indication of the weight of a vehicle when passing over the support member.

An embodiment of the invention will now be described by way of example reference being made to the accompanying drawings the single FIGURE of which is a schematic diagram of a weighing apparatus according to the invention.

With reference to the FIGURE, a transducer unit 1 includes a load cell which produces an electrical output when pressure is applied, the magnitude of the output depending upon the magnitude of the pressure applied. Such load cells are commercially available and the pressure applied to the load cell is derived from a platform 2 across which vehicles to be weighed will travel, via some form of mechanical linkage 3.

The dimensions of the platform 2 transverse to the direction of progression of the vehicles to be weighed, will depend upon the width of the widest vehicle which is to be weighed; this dimension may be of the order of ten feet. The dimension parallel to the direction of progression may be of the order of two feet. In this embodiment, it will be appreciated that the apparatus carries out a separate weighing operation for each axle of the vehicle. The results of the separate operations can then be displayed and stored separately, such that the results of weighing a single vehicle will be in the form of a set of individual axle weights; these weights may also be added to give the total weight of the vehicle concerned.

During a dynamic weighing operation, a vehicle passes over the platform, and, in response to the passage of each axle, the transducer unit produces an electrical output signal which comprises a d.c. component due to the particular axle weight of the vehicle, and a superimposed a.c. component due to the vibration of the vehicle, and consequently the platform.

The output from the transducer unit is applied to the input of a filter circuit 4. A predetermined proportion of the total input signal to the circuit 4, as determined by the values of two resistors R1 and R2 forming a potential divider network 5, is applied to a first positive input of the third differential operational amplifier A3.

The capacitor C1 removes the dc. component of the signal, and passes the a.c. component to the negative input of a first operational amplifier A1, the positive input of which is connected to earth. The a.c. signal is inverted and amplifier in amplifier A1, and is then fed to the negative input of a second operational amplifier A2, the positive input of which is also connected to earth. The a.c. signal is also inverted and amplified in amplifier A2, attenuated by resistors R7, R8 and R9 and fed, to a second, negative input of a third operational amplifier A3. The components R3, C3 and R5 C4 of the feedback loops of the amplifiers A1 and A2 respectively are chosen so as to provide phase synchronisation of the alternating signal at the second input to A3 with the a.c. component of the signal at the first input to A3. The resistors R7 R8 and R9 are chosen so that the amplitude of the a.c. signal at the second input is equal to the amplitude of the a.c. component of the signal at the first input. Since the signal applied to the second input of A3 has no d.c. component due to load, but only an alternating component due to the vibration, then the result at the output of A3 is a d.c. signal due to the applied load only, the vibrational signal at the second input, and the vibrational component of the signal at the first input being of the same phase, and equal in amplitude, and therefore mutually destructive when substracted in amplifier A3. The resultant d.c. signal rises to a maximum as the vehicle wheels move onto the platform remains at that maximum for a short time and then falls to zero as they roll off the platform. This signal is fed to a meter 8 which is calibrated in suitable weight units and which will give a reliable visual indication of the axle weight of a vehicle passing over the support plane. The d.c. signal is alternatively fed to electronic recording/display apparatus (not shown) which automatically derives a d.c. signal corresponding to the said maximum value of the signal from the circuit 4, and either displays or records this signal, or both.

The phase shift between the input to the capacitor C1 and the negative input to the operational amplifier A3 must clearly be 0° in order that the alternating component be eliminated.

The total phase shift caused by A1, A2 and R4 is −360°, i.e. equivalent to 0°. C1 imposes a +90° phase shift, and the feedback loops R5 C4 and R3, C3 cause phase shifts of $\tan^{-1}\omega R5\ C4$ and $\tan^{-1}\omega R3\ C3$, where $\omega$ is the angular frequency of the alternating signal. It may be shown that, in order to ensure 0° phase shift of the alternating component, the following condition must be satisfied:

$$^2 C_4 C_3 R_5 R_3 = 1$$

Therefore, maximum attenuation of the a.c. component occurs at a centre frequency $fo$, where $$fo = \frac{1}{2\pi (C_4 C_3 R_5 R_3)^{1/2}}$$

Thus, the values of the capacitors and resistors may be chosen such that the maximum attenuation occurs at a particular frequency of vibration. Experiments have shown that there is a particular frequency at which vibration tends to occur, and by measuring this frequency and applying the value to the above equation, the preferred values of the resistive and capacitive components may be obtained. This particular frequency is in the region of 3 Hz, and since this is very close to the effective frequency of the varying d.c. voltage which is produced as the vehicle wheels move across the platform and which must be unaffected by the circuit it is important that the bandwidth of A.C. frequencies rejected by the filter circuit be narrow so that the low frequency a.c. component of the signal produced by the transducer unit 1 is filtered out, and the d.c. component remains.

The feedback network of C2 and R6 is designed to provide the filter with such a narrow bandwidth, and correspondingly high quality factor. R6 is variable and by this means the Q of the filter can be varied to provide the optimum operational bandwidth, by altering the overall negative feedback of the operational amplifiers A1 and A2.

It is also desirable to eliminate spurious high frequency noise signals, and this is achieved by arranging the values of the components C5 and R10 in a parallel feedback loop round amplifier A3 to give an attenuation slope at the centre frequency $fo$ with a slope of −6dB per octave.

Thus, the frequency of the a.c. component at which maximum attenuation occurs is determined by the values of R3, C3, R5 and C4; the bandwidth of attenuation is determined by the values R6 and C2, the elimination of high frequency noise is achieved by setting the values for C5 and R10, and the amplitude of the a.c. signal at the negative input to A3 is equalised with that of the a.c. component of the signal at the positive input by choosing values for R7 and R8 and R9.

We claim:

1. Apparatus for weighing vehicles in motion, comprising a support member across which vehicles to be weighed will travel, a transducer arranged to produce a first electrical signal indicative of the force applied to the support member when a vehicle passes over it, and a filter circuit for selectively attenuating an alternating component in said first electrical signal, said filter circuit having an input, and comprising a differential amplifier which has first and second inputs, and which is operative to produce an output according to the difference between signals applied to the first and second inputs, a first circuit path extending from the input of the filter circuit to the first input of the differential amplifier, for feeding to said first input at least a portion of said first signal, and a second circuit path extending from the input of the filter circuit to the second input of the differential amplifier for feeding to said second input a second signal derived from the alternating component of said first signal, said second circuit path including a capacitor coupled to said input of the filter circuit for passing only the alternating component of the first signal and for ensuring phase synchronism of that part of the second signal, and the corresponding part of the alternating component of the first signal, as supplied to the first input, which is at a chosen frequency, a pair of serially connected operational amplifiers coupled between said capacitor and the second input to the differential amplifier, each having a reactive negative feedback loop having impedances that determine said chosen frequency to be in the region of 3Hz, the output of the differential amplifier constituting the filter circuit output, the frequency of maximum attenuation by said filter circuit corresponding to said chosen frequency.

2. Apparatus according to claim 2 wherein each negative feedback loop comprises, in parallel, a resistor and a feedback capacitor.

3. Apparatus according to claim 1 including means responsive to the output of said differential amplifier for visually indicating the weight or axle weight of a vehicle passing over said platform.

* * * * *